…

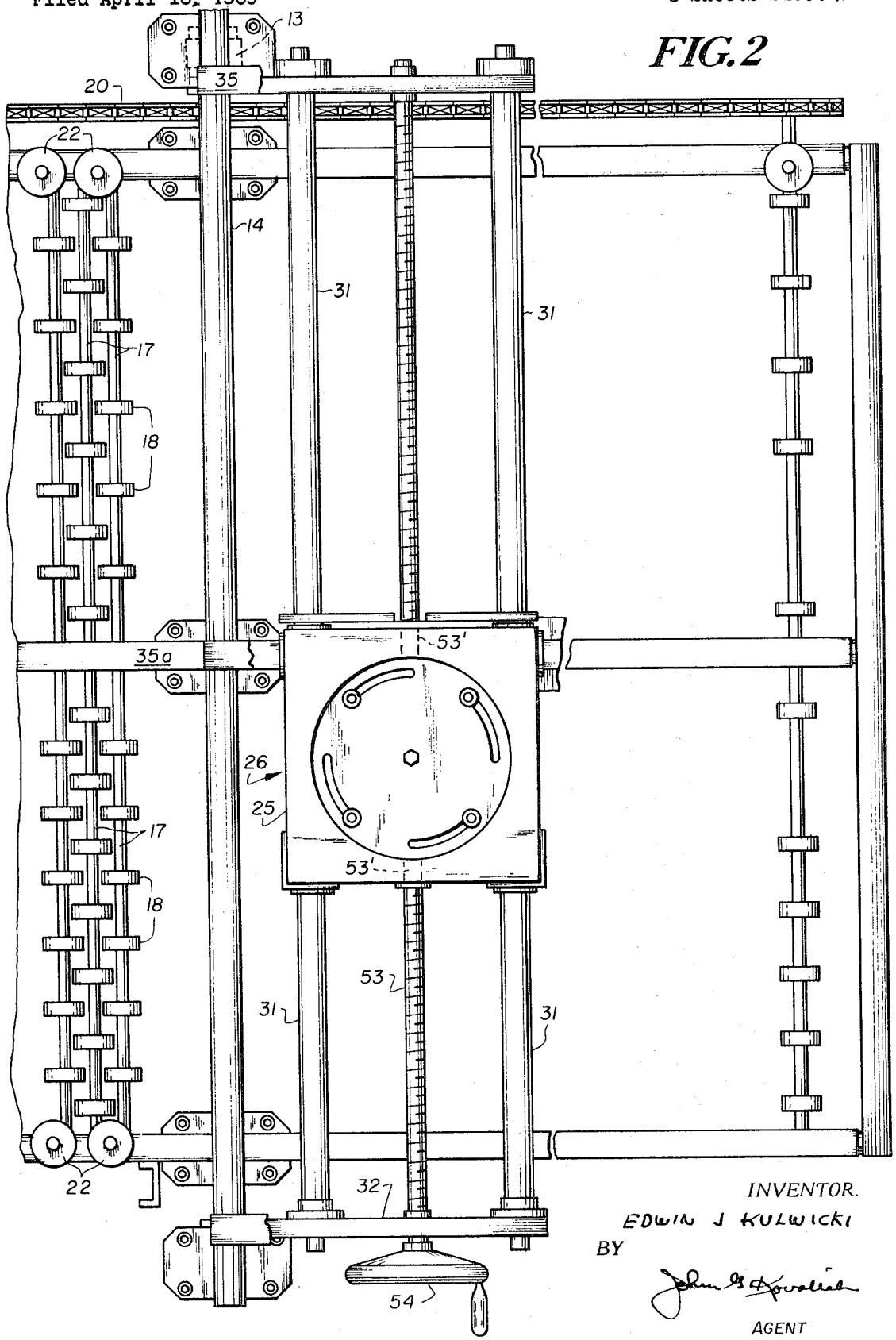

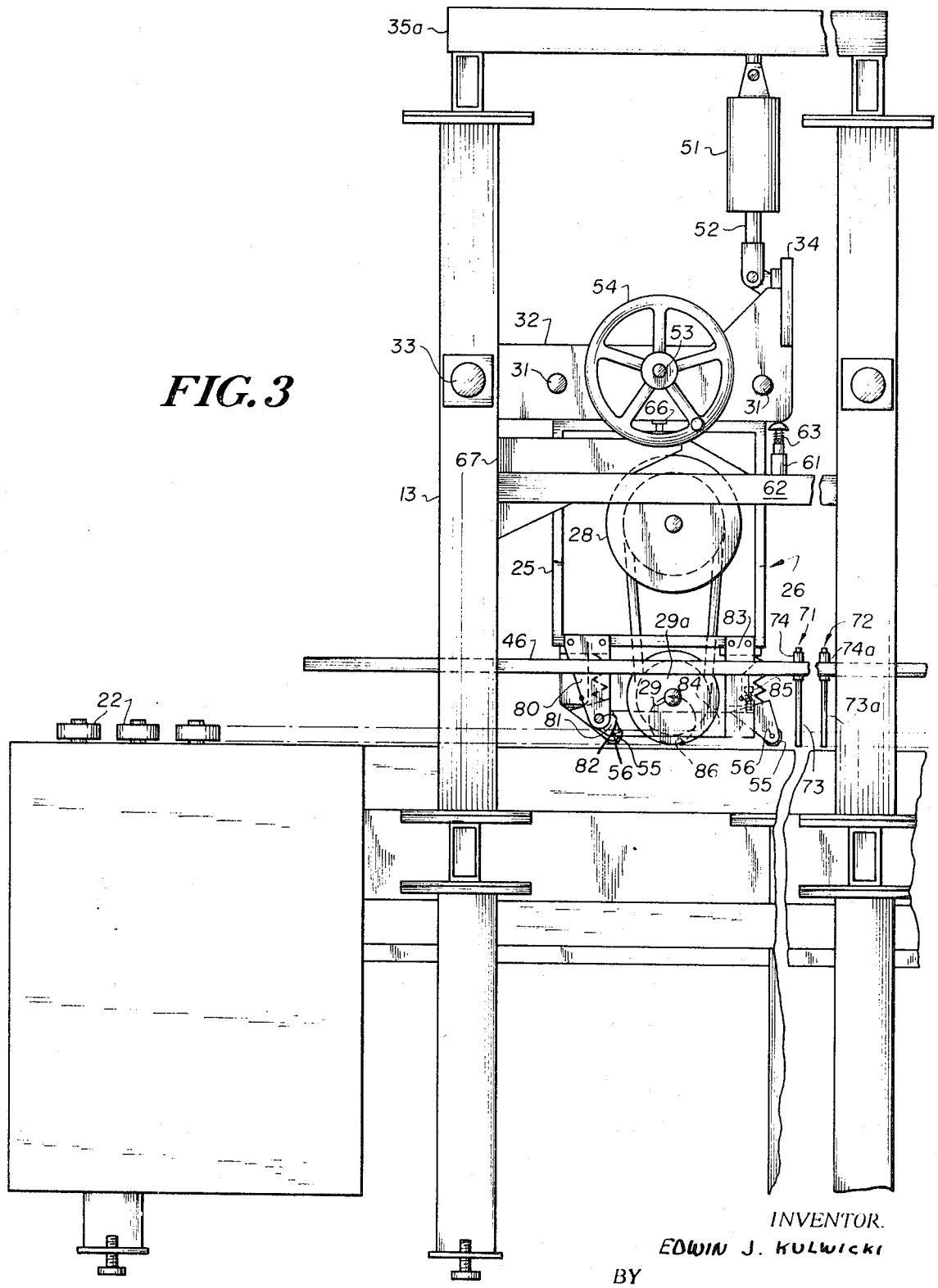

United States Patent Office 3,570,186
Patented Mar. 16, 1971

3,570,186
GRINDING MACHINE FOR GROOVING GLASS
Edwin J. Kulwicki, Toledo, Ohio, assignor to Sun Tool Machine Co., Toledo, Ohio
Filed Apr. 18, 1969, Ser. No. 817,449
Int. Cl. B24b 7/00
U.S. Cl. 51—78                6 Claims

ABSTRACT OF THE DISCLOSURE

A grinding machine for grooving glass surfaces to provide for fingerpulls, miters and plate grooves, especially for mirrors, comprising a grinding head including a motor and a motor driven spindle for carrying a grinding tool, e.g. a grinding wheel, means for selectively moving the grinding head horizontally and vertically, and control means contactable with the glass workpiece for raising and lowering the grinding head into and out of contact with a surface of the glass workpiece.

BACKGROUND OF THE INVENTION

In the plate glass and mirror industry, it is frequently necessary to provide fingerpulls, miters and plate grooves in the flat glass surface, e.g. fingerpulls are provided in plate glass doors, partitions and the like as gripping means for slidably opening and closing such elements. In the mirror industry, grooves in the plate glass surface are provided for decorative purposes to define borders and the like.

Traditionally, grooving of plate glass surfaces has been done by skilled operators who apply a grinding tool, e.g. an abrasive wheel held in a suitable jig to the glass surface to effect the desired cut. When making such grooves, considerable variation in depth and width of cut is encountered unless highly skilled artisans are employed, and the time required to do the work makes the process uneconomical.

In this art there is a need for a fully controllable grooving apparatus which will permit exact placement and control of width and depth of cut for the aforementioned purpose.

SUMMARY OF THE INVENTION

The present invention solves the major problem of the prior art by providing a machine having a control mechanism for the placement and control of depth and length of groove in a plate glass surface.

The machine, according to the present invention, has a grinding head consisting of a welded frame, a motor mounted in the frame, and a belt-driven spindle for carrying a grinding wheel, the grinding head, of which there may be more than one, slides on supporting horizontal bars, e.g. a pair of parallel supporting bars, and can be positioned accurately across the machine by a threaded rod, such as an acme screw, and handwheel. Fixed to both ends of the supporting bars are endplates each of which are at one end thereof pivotably connected to the machine main welded frame, the other end of the endplates being held by a lift arm which bridges the end plates and is parallel to the supporting bars. The acme thread and handwheel are secured to the endplates with the acme thread being threadedly engaged with the frame of the grinding head. At the center of the lift arm is attached an air cylinder that lowers and raises the grinding head in and out of contact with the glass. The air cylinder is mounted on the main frame, and the weight of the lift bar is counterbalanced by adjustable tension springs which are positioned between the main frame and the lift bar. Below the grinding head is the conveyor part of the machine which carries the glass sheet under the grinding wheels. Idler rollers are provided for positioning the glass sheet laterally. Control means for controlling the movement of the grinding head into and out of engagement with the glass sheet consist of a first probe means for initiating movement of the head into contact with the glass, and for activating a grinding cycle. A second probe means forwardly spaced from the first probe means is provided for retracting the head after the glass sheet has moved forwardly through a predetermined horizontal distance. Dampening means are provided to slow the vertical movement of the heads as they approach the workpiece.

It is the primary object of the present invention to provide an apparatus for glass grinding which is particularly adapted for cutting fingerpulls, miters and plate grooves into the surface of plate glass and mirrors.

DESCRIPTION OF THE DRAWINGS

FIG. 2 is a fragmentary top view of the machine of FIG. 1 with certain parts omitted,
and
FIG. 3 is a fragmentary side view of the machine of FIG. 1.

DESCRIPTION OF THE PREFERRED EMBODIMENT

Figure 1:
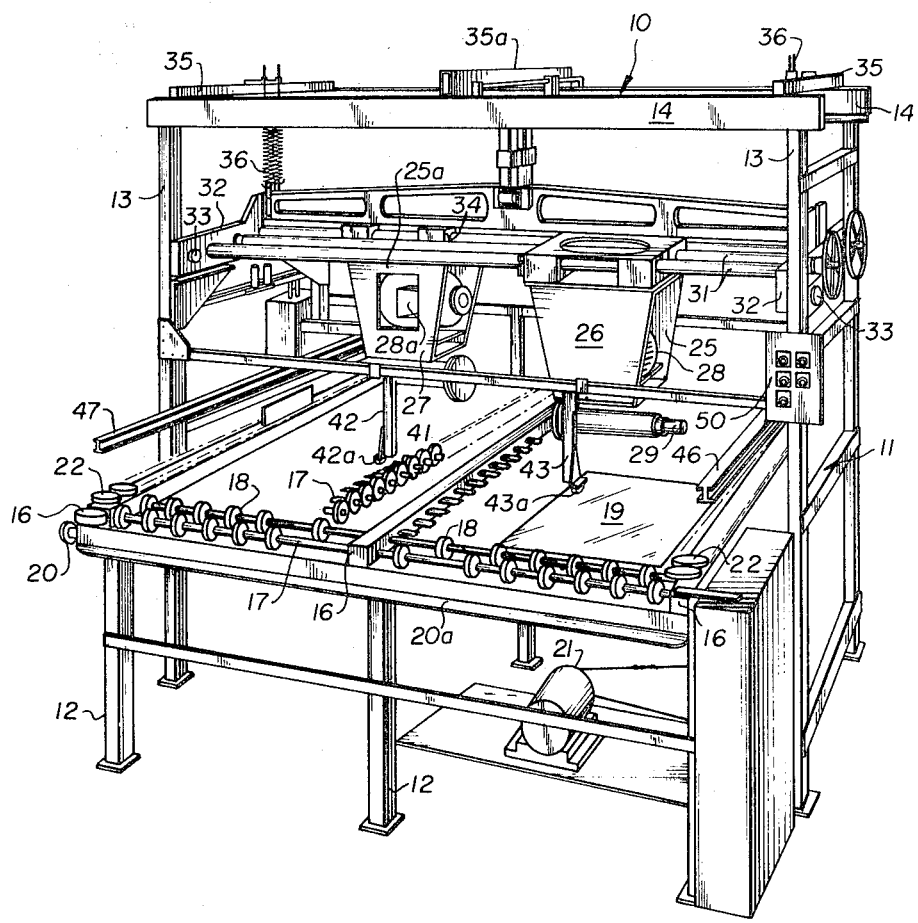
FIG. 1 is a front view in perspective of a machine embodying the invention.

A machine embodying the invention is generally indicated in FIG. 1 by the reference numeral 10. The depicted machine consists of a main supporting frame 11 having legs 12, vertical supports 13 and horizontal overhead supports 14. Longitudinal frame stringers 16 act as bearing supports for a series of shafts 17 carrying rollers 18 which support and convey the workpiece, e.g. a sheet of plate glass 19, past a grinding head during the grinding operation. Shafts 17 are sprocketed at one end and driven by a chain 20 from a jackshaft 20a, which is powered by motor 21 by conventional linkage. Idler rollers 22 serve to align the glass workpiece 19 laterally on the conveyor as its passes under the grinding head.

In the embodiment of the invention depicted in FIG. 1, two grinding heads 26 and 27 are shown, but it will be understood that the machine may be built with a single grinding head. For practical purposes, a bed width of up to 6 or 8 feet is economically advantageous so that large plate glass panels, e.g. sliding partitions and the like, may be handled. Often, however, the machine will be used for grooving narrower glass widths, e.g. mirrors of from 2–3 feet width, and by providing duplicate grinding heads, the machine is capable of increased and more economical output of such narrower items.

Each of the grinding heads 26 and 27 consists of a welded frame 25 and 25a, respectively, motor 28 and 28a, respectively, and mandrels such as mandrel 29 of grinding head 26 on which a suitable grinding tool, e.g. an abrasive wheel 29a as illustrated by FIG. 3, can be mounted. The grinding heads are supported on a pair of parallel rails 31 which are fixedly mounted in spaced end plates 32. The plates 32 are pivotally mounted at one end, as at 33, on vertical supports 13 and, at the other end, are connected to lift frame 34 which is suspended from horizontal overhead supports 35 of the main frame by adjustable springs 36.

Horizontal member 41 of the main frame extends above and transversely across the roller conveyor and supports legs 42 and 43 which extend downwardly and engage the workpiece by a spring-actuated friction wheel 42a and 43a located at the base of each leg to ensure conformance of the workpiece to the roller surface during operation of the machine. Horizontal members 46 and 47 of the main frame extend parallel to the direction of movement of the workpiece and act as supports for wand-switch probes as more fully described hereinafter.

Control box 50 is mounted at the front end of the main supporting frame.

Referring to FIGS. 2 and 3, the supporting mechanism for grinding head 26 is shown in detail. It will be appreciated that this mechanism is duplicated for independent operation of grinding head 27 as illustrated in FIG. 1. The grinding head 26, consisting of welded frame 25, motor 28 which drives mandrel 29 as illustrated in FIG. 3 and to which an abrasive wheel 29a is attached is slidably mounted on the pair of cylindrical rails 31, which are fixedly mounted in the spaced end plates 32. Each end plate 32 is pivotably mounted in vertical frame support 13 at 33, and the other end of plate 32 is secured to lift frame 34. An air cylinder 51 is attached to horizontal frame support 35a, the movable piston 52 of the cylinder being pivotally attached to left frame 34, thus providing means for lowering the end plates 32 and consequently the grinding head 26 into and raising the grinding head out of, contact wtih the work surface 19 which is illustrated in FIG. 1.

Mounted on end frame 32 is a threaded rod 53 connected to and rotatable by means of wheel 54 which engages internally threaded bore 53 by welded frame 25, by means of which grinding head 26 can be positioned at any point across the surface of the workpiece while riding on parallel horizontal rods 31.

An important feature of the present invention is the provision of means for controlling the depth of penetration of the grinding tool into the workpiece surface. It will be appreciated that plate glass can vary slightly in thickness, and that in cutting V-shaped grooves into the surface, the width of the groove will vary unless the depth of cut is essentially constant. Control of the depth of cut by measurement from the back side of the glass, the glass thickness can vary, will result in a groove of varying width depending upon the variation in glass thickness. In the present invention, grinding head 26 is provided with adjustable idler rollers 55 which pivot about set screw 56, and which are positioned to enable the rollers to operate as further hold-down rollers at the work zone and to follow the glass surface to permit a pre-set depth of penetration of the abrasive wheel into the workpiece. In addition to the idler rollers 55, there is provided a groove depth control linkage comprising a pivot arm bracket 80 depending from the grinding head frame 25 with a pivot arm 81 pivoted at the lower end portion 82 of the bracket 80. A second bracket 83 depends from the frame 25 at a location forwardly of bracket 80 at a spacing greater than the diameter of grinding wheel 29a. The lower end portion of the bracket 83 is split to provide a slot (not shown) which receives the free end portion 84 of pivot arm 81 adjustably vertically movable therein by means of the adjusting screw 85. A roller 86 is rotatably mounted on pivot arm 81 and its vertical position is determined by set screw 85. Thus lowering or raising the roller 86, which rides on the glass surface adjacent the cut being made, determines and controls the depth of the groove being cut. By thus controlling the depth of cut, a groove of consistent and accurate width is obtained despite variation in thickness of the glass workpiece.

Referring to FIG. 3, damping assembly 61 is provided to slow the vertical movement of the wheel as it approaches the sheet of glass 19. Damping assembly 61 is mounted preferably on the top surface of horizontal member 62 of the main frame and includes a spring biased plunger 63 which engages an end portion of end plate 32 as it descends. As the grinding head approaches the glass, the end plate 32 hits the plunger of cylinder 61. This slows the descending or vertical movement of the wheel 29a as it approaches the critical grinding stage and prevents chipping and cracking of the workpiece at the initial point of contact. Adjustable full stops 66 mounted on horizontal member 67 of the main frame engages end plate 32 to prevent descent of the grinding head beyond any desired fixed position.

Regarding FIG. 3, attention is directed to rail 46 which is fixedly attached to the main supporting frame and may be calibrated for position indexing of spaced wand-switch contacts 71 and 72. The latter are movably mounted on rail 46, and consist of a wand 73 and 73a, respectively, mounted in switchbox 74 and 74a. As the workpiece contacts the wand 73 of the wand-switch contact 71, an electrical signal is generated which activates movable piston 52 of air cylinder 51, and lowers the grinding head 26 to position grinding wheel 29a into contact with the glass. As the workpiece is conveyed past the grinding wheel and subsequently contacts wand contact wand 73a of wand-switch contact 72, a switching mechanism moves air piston 52 upwardly and disengages the wheel from the workpiece. By suitable space adjustment of the position of contacts 71 and 72, the length of the cut into the glass surface is readily controlled.

In operating the machine described hereinabove for the production of finger-pulls, it is desirable to provide for a time lag in order for the wheel to reach a desired depth of cut. Electrical circuitry is provided, so that, simultaneously with lowering of the head into the workpiece, motor 21 of FIG. 1 is stopped and the workpiece remains stationary until the desired depth of cut is reached. The angle of entry to the workpiece will, of course, depend upon the diameter of the grinding wheel 29a employed. After suitable depth has been reached, a time-delay switch causes motor 21 to be reactivated and head 26 withdrawn as the leading edge of the workpiece contacts wand-switch 72.

Various modifications of the above-described embodiment of the invention will be apparent to those skilled in the art, and it is understood that such modifications can be made without departing from the scope of the present invention.

What I claim is:

1. A machine for grinding grooves in the flat surface of a plate glass workpiece comprising in combination,
   a main frame,
   a grinding head comprising a head frame, a motor and a driven spindle adapted to receive a grinding tool and carried by the head frame,
   support means for horizontally slidably supporting the grinding head, said support means comprising spaced end plates bridged by at least one horizontal rod, the head frame being slidable along the rod, one end of each of said end plates being pivotably mounted in said main frame whereby one side of said support means is pivotably movable, the other side of the support means being movably suspended from said main frame,
   a driven conveyor for moving a workpiece beneath the grinding head,
   means for vertically moving said grinding head,
   control means for raising and lowering said grinding head into contact with the workpiece, said control means including a first probe means for initiating downward movement of said grinding head upon contact of said probe means with the leading edge of the workpiece, second probe means spaced from the first probe means along the direction of travel of said conveyor, said second probe means initiating upward movement of said grinding head upon contact of the second probe means with the leading edge of the glass workpiece.

2. A machine according to claim 1, wherein said means for vertically moving the grinding head comprises a fluid cylinder connected to a top portion of the main frame and the said other side of the support means.

3. A machine according to claim 1 wherein said grinding head includes adjustable means for controlling the depth of penetration of the grinding tool into the workpiece.

4. A machine according to claim 1 including damping means for slowing the vertical movement of the grinding head as it approaches the workpiece.

5. A machine according to claim 1 including means for horizontally selectively positioning said grinding head on said supporting means.

6. A machine according to claim 5, wherein said positioning means comprises a threaded rod bridging said spaced end plates and said head frame having an internally threaded bore engageable with said threaded rod.

References Cited

UNITED STATES PATENTS

| 1,536,557 | 5/1925 | Browning | 51—78X |
|---|---|---|---|
| 2,340,121 | 1/1944 | Hamilton | 51—78 |
| 2,925,691 | 6/1960 | Kibble | 51—78 |
| 2,833,090 | 5/1958 | Touvay | 51—112 |
| 3,136,216 | 6/1964 | Littwin | 51—87X |
| 3,220,146 | 11/1965 | Ross | 51—139 |

OTHELL M. SIMPSON, Primary Examiner